(12) United States Patent (10) Patent No.: US 12,612,494 B2
Ihara et al. (45) Date of Patent: Apr. 28, 2026

(54) ORGANOPOLYSILOXANE COMPOSITION FOR USE IN RELEASE PAPER OR RELEASE FILM

(71) Applicant: SHIN-ETSU CHEMICAL CO., LTD., Tokyo (JP)

(72) Inventors: Toshiaki Ihara, Annaka (JP); Ataru Kobayashi, Annaka (JP); Tsuneo Kimura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 728 days.

(21) Appl. No.: 17/911,882

(22) PCT Filed: Mar. 15, 2021

(86) PCT No.: PCT/JP2021/010295
§ 371 (c)(1),
(2) Date: Sep. 15, 2022

(87) PCT Pub. No.: WO2021/187401
PCT Pub. Date: Sep. 23, 2021

(65) Prior Publication Data
US 2023/0144102 A1 May 11, 2023

(30) Foreign Application Priority Data
Mar. 16, 2020 (JP) ................................. 2020-044865

(51) Int. Cl.
| | |
|---|---|
| *C08J 5/18* | (2006.01) |
| *C08G 77/08* | (2006.01) |
| *C08G 77/12* | (2006.01) |
| *C08G 77/20* | (2006.01) |
| *C09D 183/04* | (2006.01) |
| *D21H 19/32* | (2006.01) |
| *D21H 27/00* | (2006.01) |

(52) U.S. Cl.
CPC ................ *C08J 5/18* (2013.01); *C08G 77/08* (2013.01); *C08G 77/12* (2013.01); *C08G 77/20* (2013.01); *C09D 183/04* (2013.01); *D21H 19/32* (2013.01); *D21H 27/001* (2013.01); *C08J 2383/05* (2013.01); *C08J 2383/07* (2013.01)

(58) Field of Classification Search
CPC ...... C08J 5/18; C08J 2383/05; C08J 2383/07; C08G 77/08; C08G 77/12; C08G 77/20; C09D 183/04; C09D 7/61; C09D 7/65; C09D 7/63; D21H 19/32; D21H 27/001; B32B 7/06; B32B 27/00; C08K 5/14; C08K 5/56; C08L 83/04; C08L 2205/025; C09K 3/00
See application file for complete search history.

(56) References Cited

U.S. PATENT DOCUMENTS

| | | | |
|---|---|---|---|
| 4,201,808 A | 5/1980 | Cully et al. | |
| 2006/0047097 A1* | 3/2006 | Tanaka | C08L 83/04 |
| | | | 524/588 |
| 2011/0274935 A1 | 11/2011 | Yamamoto et al. | |
| 2017/0107415 A1 | 4/2017 | Shiono | |
| 2017/0342677 A1* | 11/2017 | Uno | E02D 27/38 |
| 2018/0118939 A1 | 5/2018 | Zou | |
| 2019/0002746 A1 | 1/2019 | Nakayama | |

FOREIGN PATENT DOCUMENTS

| | | |
|---|---|---|
| EP | 2444463 A1 | 4/2012 |
| JP | 35-13709 B | 9/1960 |
| JP | 47-32072 A | 11/1972 |
| JP | 54-162787 A | 12/1979 |
| JP | 2006-131813 A | 5/2006 |
| JP | 2007-106905 A | 4/2007 |

(Continued)

OTHER PUBLICATIONS

Lu et al.; Safety and kinetic parameters analysis for 1,1,-Di(tert-butylperoxy) cyclohexane mixed with monoammonium phosphate; Journal of Loss Prevention in the Process Industries 34 (2015) 191-195 (Year: 2015).*
Altman Chemicals "Polydimethylsiloxane" (Year: 2020).*
Pergan "Polymerization of Monomers with Organic Peroxides" (Year: 2018).*
International Search Report, issued in PCT/JP2021/010295, PCT/ISA/210, dated Apr. 13, 2021.

*Primary Examiner* — Randy P Gulakowski
*Assistant Examiner* — Holley Grace Hester
(74) *Attorney, Agent, or Firm* — Birch, Stewart, Kolasch & Birch, LLP

(57) ABSTRACT

This organopolysiloxane composition for use in release paper or release film, said organopolysiloxane composition containing (A) an organopolysiloxane having two or more silicon atom-bonded alkenyl groups in each molecule, (B) an organohydrogen polysiloxane having two or more silicon atom-bonded hydrogen atoms (Si—H groups) on average in each molecule, (C) an organic peroxide and (D) a specific amount of a platinum group metal-based catalyst, is capable of undergoing an addition reaction with a smaller amount of the platinum group metal-based catalyst in comparison to the prior art, thereby being capable of forming a cured coating film which has a release strength equivalent to that of the prior art even in cases where a component that inhibits the catalytic activity of the platinum group metal-based catalyst is contained in the composition. In addition, this organopolysiloxane composition is capable of forming a cured coating film by means of an addition reaction even on a base material containing a catalyst poison component, on said base material conventional compositions being not able to be cured.

9 Claims, No Drawings

(56)     References Cited

FOREIGN PATENT DOCUMENTS

| | | | |
|---|---|---|---|
| JP | 4314454 | B2 | 8/2009 |
| JP | 4569753 | B2 | 10/2010 |
| JP | 2011-252142 | A | 12/2011 |
| JP | 2012-92165 | A | 5/2012 |
| JP | 2017-25135 | A | 2/2017 |
| JP | 2017-75218 | A | 4/2017 |
| JP | 2018-510240 | A | 4/2018 |
| KR | 2010-0097130 | A | 9/2010 |
| WO | WO2009/060964 | A1 | 5/2009 |
| WO | WO2018/190012 | A1 | 10/2018 |

* cited by examiner

ORGANOPOLYSILOXANE COMPOSITION FOR USE IN RELEASE PAPER OR RELEASE FILM

TECHNICAL FIELD

This invention relates to an organopolysiloxane composition for release paper or release film which is promoted in cure with a smaller amount of platinum group metal than in the prior art and which is curable even when it contains an amine or analogous component inhibiting the catalyst activity of a platinum group metal base catalyst.

BACKGROUND ART

In the prior art approach for preventing adhesion or bond between sheet-like substrates such as paper and plastic sheets and pressure-sensitive adhesives, a cured film of an organopolysiloxane composition is disposed on the substrate surface to impart release properties. The following methods are known for forming a cured organopolysiloxane film on the substrate surface.

(1) method for forming a releasable film through addition reaction between an alkenyl-containing organopolysiloxane and an organohydrogenpolysiloxane in the presence of a platinum group metal based compound as catalyst (Patent Document 1: JP-A S47-032072)

(2) method for forming a releasable film through condensation reaction of an organopolysiloxane having a functionality such as hydroxy or alkoxy in the presence of an organometallic salt as catalyst (Patent Document 2: JP-B S35-013709)

(3) method for forming a releasable film by effecting radical polymerization of an acryloyl group-containing organopolysiloxane using a photoinitiator and UV or electron beam (Patent Document 3: JP-A S54-162787)

Among the above methods (1), (2) and (3), method (1) for forming a releasable film through addition reaction in the presence of a platinum group metal base catalyst is widely utilized because of effective cure and because it can accommodate a variety of requisite release properties covering from low-speed release to high-speed release.

In the prior art, the platinum group metal base catalyst is often used in a concentration of 50 to 400 ppm of platinum based on the release paper or film-forming organopolysiloxane composition. The reason is that if the platinum concentration is less than 50 ppm, cure reaction does not take place to a full extent so that the cured film becomes soft, and the amount of residual Si—H groups becomes more so that the release force becomes high. In addition, the unreacted raw material, organopolysiloxane remains and becomes a migrating component so that the organopolysiloxane migrates to the pressure-sensitive adhesive surface to be attached to release paper, to incur a drop of adhesive force.

It is known for addition reaction that the cure of platinum group metal base catalysts is inhibited by admixture of phosphorus, nitrogen, sulfur, and tin-containing compounds. Since some cure inhibitory compounds can become active even in an admixture amount of a few ppm, the cure of release paper can be significantly inhibited when paper and film substrates contain traces of inhibitory compounds.

Further, the platinum group metals are expensive because they are noble metals which are rare on the earth. The platinum group metal base catalyst accounts for a large proportion in the manufacture cost of release paper or release film. Therefore, reducing the amount of platinum group metal base catalyst leads to a lower price.

Among addition reaction cure type silicone rubber compositions for liquid silicone resin adhesives is an addition reaction cure type silicone rubber composition which is resistant to cure inhibitory compounds such as nitrogen, sulfur and phosphorus-containing compounds. Patent Document 4 (JP 4314454) proposes a composition having blended therein an organic peroxide having a 10-hour half-life temperature of at least 40° C.

However, the addition reaction cure type silicone rubber composition for liquid silicone resin adhesives is delayed in cure time by blending the organic peroxide having a 10-hour half-life temperature of at least 40° C. therein. Patent Document 5 (JP 4569753) thus proposes a composition having a metal or metal compound selected from copper, copper compounds, manganese, manganese compounds, iron, iron compounds, silver and silver compounds and an acetylacetone compound blended therein as extra additives. Since Examples take a cure time of 10 minutes to 100 minutes at 100° C., the composition cannot be used in the release paper application requiring cure completion within 60 seconds, preferably within 30 seconds.

PRIOR ART DOCUMENTS

Patent Documents

Patent Document 1: JP-A S47-32072
Patent Document 2: JP-B S35-13709
Patent Document 3: JP-A S54-162787
Patent Document 4: JP 4314454
Patent Document 5: JP 4569753

SUMMARY OF INVENTION

Technical Problem

An object of the invention, which has been made under the above-mentioned circumstances, is to provide a release paper or film-forming organopolysiloxane composition which is capable of addition reaction with a smaller amount of a platinum group metal base catalyst than in the prior art and even in the presence of a component inhibiting the catalyst activity of a platinum group metal base catalyst, which forms a cured film having an equivalent release force to that in the prior art, and which can cure through addition reaction even on a catalyst poison-containing substrate that is cure-inhibitory in the prior art.

Solution to Problem

Making extensive investigations to attain the above object, the inventors have found that the outstanding problems of an addition reaction cure type organopolysiloxane composition can be solved by blending 0.01 to 5 parts by weight of organic peroxide (C) with 100 parts by weight of component (A).

In the case of the addition reaction cure type silicone rubber composition for liquid silicone resin adhesive, described in the Background Art section, the cure time is delayed (or prolonged) when an organic peroxide is blended in the composition. In contrast, the inventors' study has revealed that when an organic peroxide is blended, the release paper or film-forming organopolysiloxane composition of the invention is improved in cure (in a cured state-observing test including coating the release paper or film-forming organopolysiloxane composition to paper in a coating weight of 0.9 to 1.1 g/m², heat treating in a dryer at 120° C. for 30 seconds, and rubbing the coating surface with the finger, as will be described in detail for the test method in Examples and Comparative Examples) and hence, the cure time is accelerated (or shortened).

The result is different from that of the addition reaction cure type silicone rubber composition for liquid silicone resin adhesives for the presumed reason that these compositions are largely different in that the addition reaction cure type silicone rubber composition for liquid silicone resin adhesives contains a large amount of silica or calcium carbonate. In an experiment of curing both the compositions at the same temperature (120° C.), the release paper or film-forming organopolysiloxane composition is cured within 30 seconds, whereas the addition reaction cure type silicone rubber composition for liquid silicone resin adhesives needs more than 1 hour, indicating different reaction speeds. They are also different in that the release paper or film-forming organopolysiloxane composition does not contain silica or the like, which is contained in the addition reaction cure type silicone rubber composition for liquid silicone resin adhesives. The release paper or film-forming organopolysiloxane composition has a high H/Vi ratio preferably in the range of from 1.2 to 3.0, in contrast to a H/Vi ratio of 0.41 in Example in Patent Document 5. The excess of Si—H groups is also a significant difference.

Accordingly, the invention provides a release paper or film-forming organopolysiloxane composition (sometimes simply referred to as "organopolysiloxane composition," hereinafter) as defined below.

[1]

An organopolysiloxane composition for release paper or release film, comprising at least the following components (A) to (D):

(A) 100 parts by weight of an organopolysiloxane having at least two silicon-bonded alkenyl groups per molecule, (B) an organohydrogenpolysiloxane having on the average at least two silicon-bonded hydrogen atoms (or Si—H groups) per molecule in an amount to give 1 to 5 moles of Si—H groups per mole of alkenyl groups in component (A), (C) an organic peroxide in an amount of 0.01 to 5 parts by weight per 100 parts by weight of component (A), and (D) a platinum group metal base catalyst in an amount to give 1 to 500 ppm of platinum group metal based on the total weight of components (A), (B), (C) and (D).

[2]

The organopolysiloxane composition of [1], further comprising (E) an addition reaction inhibitor in an amount of 0.01 to 5 parts by weight per 100 parts by weight of component (A).

[3]

The organopolysiloxane composition of [1] or [2] wherein component (C) is a polyfunctional organic peroxide having at least two peroxy bonds in the molecule.

[4]

The organopolysiloxane composition of any one of [1] to [3] wherein component (C) has a 10-hour half-life temperature of 70° C. to 120° C.

[5]

The organopolysiloxane composition of any one of [1] to [4] wherein the organic peroxide component (C) is a peroxyketal.

[6]

The organopolysiloxane composition of any one of [1] to [5] wherein the organic peroxide as component (C) has a heat generation starting temperature of at least 100° C. as analyzed by DSC.

[7]

The organopolysiloxane composition of any one of [1] to [6], having a flash point of at least 250° C.

Advantageous Effects of Invention

The invention provides an organopolysiloxane composition for release paper or film which is capable of addition reaction with a minor amount of a platinum group metal base catalyst and even in the presence of a component of inhibiting the activity of the platinum group metal base catalyst, and which exhibits a release force equivalent to the level obtained from a large amount of the catalyst. This enables to form a silicone cured film even under the conditions that are substantially cure-inhibitory in the prior art, leads to a substantial reduction of manufacture cost, and enables to form a cured film through addition reaction even on a substrate containing a catalyst poison.

DESCRIPTION OF EMBODIMENTS

Now the invention is described in detail.

[Component (A)]

Component (A) is an organopolysiloxane having at least two silicon-bonded alkenyl groups per molecule, which may be used alone or in combination of two or more. Typical of component (A) is an organopolysiloxane having a structure of the following formula (1).

$$M_a M^{vi}_b D_c D^{vi}_d T^e T^{vi}_f Q_g \qquad (1)$$

Herein M is $R_3SiO_{1/2}$, $M^{vi}$ is $R_2PSiO_{1/2}$, D is $R_2SiO_{2/2}$, $D^{vi}$ is $RPSiO_{2/2}$, T is $RSiO_{3/2}$, $T^{vi}$ is $PSiO_{3/2}$, Q is $SiO_{4/2}$, R is each independently a $C_1$-$C_{12}$ substituted or unsubstituted monovalent hydrocarbon group free of aliphatic unsaturation, P is an alkenyl group of the formula: $-(CH_2)_n-CH=CH_2$ wherein n is an integer of 0 to 6, a, b, d and f are each independently 0 or a positive number, not all b, d and f are 0 at the same time, $2 \leq b+d+f \leq 500$, c is a positive number of 10 to 27,000, e is 0 or a positive number of up to 200, and g is 0 or a positive number of up to 1,000.

In formula (1), R is each independently a substituted or unsubstituted monovalent hydrocarbon group of 1 to 12 carbon atoms, preferably 1 to 10 carbon atoms, more preferably 1 to 8 carbon atoms, free of aliphatic unsaturation. Examples include alkyl groups such as methyl, ethyl, propyl, butyl, pentyl, hexyl, octyl, decyl and dodecyl, cycloalkyl groups such as cyclohexyl, aryl groups such as phenyl, naphthyl and tolyl, aralkyl groups such as benzyl and phenethyl, and substituted forms of the foregoing in which some carbon-bonded hydrogen atoms are substituted by halogen atoms, epoxy, amino, polyether, cyano or hydroxy groups. Among others, methyl preferably accounts for at least 80 mol % of the overall R in view of keeping the composition curable and reducing the release force of the cured product.

P is an alkenyl group of the formula: $-(CH_2)_n-CH=CH_2$ wherein n is an integer of 0 to 6, examples of which include vinyl, allyl, butenyl, propenyl, 5-hexenyl, and octenyl, with vinyl being preferred.

In formula (1), a, b, d and f are each independently 0 or a positive number, b, d and f are not equal to 0 at the same time, $2 \leq b+d+f \leq 500$, preferably $2 \leq b+d+f \leq 200$.

The subscript "a" is preferably 0 or a positive number of 1 to 100, more preferably 0 or a positive number of 1 to 50, b is preferably 0 or a positive number of 1 to 100, more preferably 0 or a positive number of 1 to 50, d is preferably 0 or a positive number of 1 to 500, more preferably 0 or a positive number of 1 to 300, and f is preferably 0 or a positive number of 1 to 100, more preferably 0 or a positive number of 1 to 50.

Also, c is a positive number of 10 to 27,000, preferably a positive number of 10 to 20,000, more preferably a positive number of 50 to 15,000. If c is less than 10, a more amount of mist is generated when the coating speed exceeds 200 m/min with the risk that the coating surface of the organopolysiloxane composition is roughened. If c exceeds 27,000, the organopolysiloxane composition has too high a kinematic viscosity and becomes inefficient to coat so that the coating may be aggravated in smoothness and largely vary in coating weight locally.

Also, e is 0 or a positive number of up to 200, preferably 0 or a positive number of up to 20, more preferably 0 or a positive number of up to 10, and g is 0 or a positive number of up to 1,000, preferably 0 or a positive number of up to 10, more preferably 0 or a positive number of up to 5.

Component (A) should preferably have a vinyl value of 0.001 to 0.7 mol/100 g, more preferably 0.005 to 0.5 mol/100 g, and even more preferably 0.01 to 0.1 mol/100 g. If the vinyl value is less than 0.001 mol/100 g, less reaction sites may be available, leading to a cure failure. If the vinyl value exceeds 0.7 mol/100 g, the crosslinking density may become too high, the low-speed release force become too high, or peeling become difficult.

Component (A) preferably has a weight average molecular weight (Mw) of from 800 to 300,000, more preferably from 3,000 to 280,000. If the Mw of component (A) is less than 800, there is a risk that the coating weight on the substrate becomes insufficient. If the Mw exceeds 300,000, there is a risk that working becomes inefficient. As used herein, the Mw is measured by gel permeation chromatography (GPC) versus polystyrene standards using toluene solvent (the same holds true, hereinafter).

Component (A) preferably has a kinematic viscosity at 25° C. of from 7 mm²/s to a 30 wt % toluene solution viscosity (i.e., kinematic viscosity of a 30 wt % solution of organopolysiloxane in toluene) 70,000 mm²/s, more preferably from 50 mm²/s to a 30 wt % toluene solution viscosity 60,000 mm²/s. If the kinematic viscosity is less than 7 mm²/s, the coating weight becomes insufficient. If the 30 wt % toluene solution viscosity exceeds 70,000 mm²/s, working becomes inefficient.

Illustrative examples of component (A) include polysiloxanes containing alkenyl groups at both ends, polysiloxanes containing alkenyl groups on side chains, polysiloxanes containing alkenyl groups at one end and on side chains, polysiloxanes containing alkenyl groups at both ends and on side chains, and branched polysiloxanes containing alkenyl groups at ends.

Examples as expressed by structural formula include $M^{vi}_2 D_c$, $M_2 D_c D^{vi}_d$, $M_{vi}{}^3 D_c T_1$, $M^{vi}_4 D_c T_2$, $M^{vi}_2 D_c D^{vi}_d$, $M^{vi}_2 D_c Q_1$, and $M_a D_c D^{vi}_d T^{vi}_f$ wherein M, $M^{vi}$, D, $D^{vi}$, T, $T^{vi}$, Q, a, c, d, and f are as defined above (the same hereinafter). Illustrative structures include $M^{vi}_2 D_{100}$, $M_2 D_{97} D^{vi}_3$, $M_2 D_{26} D^{vi}_4$, $M_2 D_{96} D^{vi}_4$, $M_2 D_{95} D^{vi}_5$, $M^{vi}_3 D_{100} T_1$, $M^{vi}_4 D_{100} T_2$, $M^{vi}_2 D_{97}{}^{Dvi}_1$, $M^{vi}_2 D_{95} D^{vi}_3$, $M_3 D_{93} D^{vi}_3 T^{vi}_1$, $M^{vi}_2 D_{20000}$, and $M_2 D_{10000} D^{vi}_{20}$.

[Component (B)]

Component (B) is an organohydrogenpolysiloxane containing on the average at least two silicon-bonded hydrogen atoms (i.e., Si—H groups) per molecule, which may be used alone or in combination of two or more. An addition reaction takes place between Si—H groups on the organohydrogenpolysiloxane and alkenyl groups on component (A) to form a crosslinked organopolysiloxane.

The number of silicon-bonded hydrogen atoms (Si—H groups) per molecule is preferably 3 to 100, more preferably 10 to 100.

The content of Si—H groups is preferably 0.001 to 3.5 mol/100 g, more preferably 0.01 to 2.5 mol/100 g, even more preferably 0.02 to 2.0 mol/100 g. A less Si—H content may adversely affect curability and adhesion whereas an excessive content may cause a tightening of release force.

The organohydrogenpolysiloxane as component (B) preferably has a structure of the following formula (2).

$$M_h M^H_i D_j D^H_k T_L T^H_m Q_n \qquad (2)$$

Herein M is $R_3 SiO_{1/2}$, $M^H$ is $R_2 HSiO_{1/2}$, D is $R_2 SiO_{2/2}$, $D^H$ is $RHSiO_{2/2}$, T is $RSiO_{3/2}$, $T^H$ is $HSiO_{3/2}$, Q is $SiO_{4/2}$, R is each independently a $C_1$-$C_{12}$ substituted or unsubstituted monovalent hydrocarbon group free of aliphatic unsaturation, h, i, j and L are each independently 0 or a positive number, k is 0 or a positive number of up to 100, m is 0 or a positive number of up to 10, n is 0 or a positive number of up to 10, i, k and m are not equal to 0 at the same time, and $2 \leq i+k+m \leq 100$.

In formula (2), R is as exemplified above for R in formula (1), with $C_1$-$C_8$ alkyl groups being preferred.

In formula (2), h, i, j and L are each independently 0 or a positive number, h is preferably 0 or a positive number of 1 to 10, i is preferably 0 or a positive number of 1 to 10, j is preferably 0 or a positive number of 1 to 100, L is preferably 0 or a positive number of 1 to 10. Also, k is 0 or a positive number of up to 100, preferably 2 to 100, and more preferably 10 to 80, m is 0 or a positive number of up to 10, preferably 0 or a positive number of up to 5, n is 0 or a positive number of up to 10, preferably 0 or a positive number of up to 5, i, k and m are not equal to 0 at the same time, i+k+m is a positive number of 2 to 100, preferably 3 to 100, more preferably 10 to 80.

Component (B) preferably has a weight average molecular weight (Mw) of 194 to 10,000, more preferably 874 to 5,000. If the Mw of component (B) is too low, the adhesion can be markedly aggravated. If the Mw is too high, sometimes reactivity becomes poor, and curability becomes low, resulting in a reduction of residual adhesion rate or an increase of release force due to under-cure.

Component (B) should preferably have a kinematic viscosity at 25° C. of 2 to 500 mm²/s, more preferably 2 to 300 mm²/s, even more preferably 5 to 200 mm²/s as measured by an Ostwald viscometer. If the kinematic viscosity at 25° C. is less than 2 mm²/s, the adhesion to substrates can be aggravated despite good reactivity due to a low molecular weight. If the kinematic viscosity exceeds 500 mm²/s, sometimes reactivity becomes poor, and curability becomes low, resulting in a reduction of residual adhesion rate or an increase of release force due to under-cure.

Illustrative examples of the organohydrogenpolysiloxane as component (B) include polysiloxanes containing hydrogensilyl groups at both ends, polysiloxanes containing hydrogensilyl groups on side chains, polysiloxanes containing hydrogensilyl groups at one end and on side chains, and polysiloxanes containing hydrogensilyl groups at both ends and on side chains.

Examples as expressed by structural formula include $$M_2^H D_j, \; M_2 D_k^H, \; M_2 D_j D_k^H, \; M_2^H D_j D_k^H,$$

$$M_3^H D_j T_1, \; M_4^H D_j T_2, \; \text{and} \; M_h D_j D_k^H T_m^H$$

wherein M, $M^H$, D, $D^H$, T, $T^H$, h, j, k, and m are as defined above (the same hereinafter). Illustrative structures include $$M_2^H D_{10}, \; M_2^H D_{100}, \; M_2 D_{27} D_3^H, \; M_2 D_{97} D_3^H, \; M_2 D_{26} D_4^H, \; M_2 D_{25} D_5^H,$$

$$M_2 D_{24} D_6^H, \; M_2 D_{96} D_4^H, \; M_2 D_{95} D_5^H, \; M_3^H D_{100} T_1, \; M_4^H D_{100} T_2,$$

$$M_2^H D_{97} D_1^H, \; M_2^H D_{95} D_3^H, \; M_3 D_{93} D_3^H T_1^H, \; M_2 D_{30}^H, \; \text{and} \; M_2 D_{60}^H.$$

Component (B) is blended in such an amount that the moles of Si—H groups in component (B) is 1 to 5 times, preferably 1.2 to 3 times the moles of alkenyl groups in component (A). If component (B) is too less, curability and adhesion become insufficient. If component (B) is too much, the amount of residual Si—H groups becomes more so that the release force becomes high, and the amount of Si—H groups decreases with time so that the release force lowers with time.

[Component (C)]

Component (C) is an organic peroxide. Although the precise mechanism is not well understood, the organic peroxide is effective for increasing the activity of a platinum group metal base catalyst because the addition of an organic peroxide allows addition reaction to proceed with a minor amount of a platinum group metal base catalyst. Also, when the organopolysiloxane composition contains a component capable of inhibiting the activity of a platinum group metal base catalyst, or when a substrate contains a catalyst poison, it is possible to form a cured coating via addition reaction, that is, a cured coating having a release force equivalent to the prior art level.

Suitable organic peroxides include ketone peroxides, peroxyketals, hydroperoxides, dialkyl peroxides, diacylperoxides, peroxydicarbonates, and peroxy esters. Of these, polyfunctional organic peroxides having at least two oxy bonds in the molecule such as ketone peroxides and peroxyketals are preferred, with the peroxyketals being especially preferred.

Exemplary peroxyketals include 1,1-di(t-hexylperoxy)cyclohexane, 1,1-di(t-butylperoxy)cyclohexane, 2,2-di(t-butylperoxy)butane, n-butyl-4,4-di(t-butylperoxy)valerate, 1,1-di(t-amylperoxy)cyclohexane, 1,1-di(t-hexylperoxy)-3, 3,5-trimethylcyclohexane, 1,1-di(t-hexylperoxy)-2-methyl-cyclohexane, and 1,1-di(t-butylperoxy)-3,3,5-trimethylcy-clohexane.

Although the reason is not well understood, an organic peroxide having a 10-hour half-life temperature of 70° C. to 120° C., especially 80° C. to 110° C. is preferred as component (C) in view of curability. As used herein, the 10-hour half-life temperature is measured by dissolving an organic peroxide in benzene in a concentration of 0.1 mol/L or 0.05 mol/L, filling a nitrogen-purged glass tube with the solution, immersing the sealed glass tube in a thermostat bath at a preset temperature for causing thermal decomposition.

Examples of the organic peroxide having a 10-hour half-life temperature of 70° C. to 120° C. include 1,1-di(t-butylperoxy)cyclohexane: 90.7° C. (measurement concentration 0.1 mol/L), 2,2-di(t-butylperoxy)butane: 103.1° C. (measurement concentration 0.1 mol/L), and 1,1-di(t-hexylperoxy)cyclohexane: 87.1° C. (measurement concentration 0.05 mol/L).

Also, component (C) should preferably have a heat generation starting temperature of at least 100° C., more preferably 110 to 160° C. as analyzed by a differential scanning colorimeter (DSC). If the heat generation starting temperature is lower than 100° C., addition reaction can take place to promote cure during storage in summer season. It is noted that DSC measurement is by heating from 25° C. to 300° C. at a rate of 10° C./min.

The amount of component (C) blended is 0.01 to 5 parts by weight, preferably 0.05 to 3 parts by weight, more preferably 0.1 to 2 parts by weight per 100 parts by weight of component (A). If the amount of component (C) is less than 0.01 part by weight, no definite cure promoting effect is exerted. If the amount of component (C) exceeds 5 parts by weight, the migrating component increases, with a lowering of residual adhesion rate and a degradation of adhesion being sometimes observable. Since too large amounts adversely affect cure, it is believed that the improvement in cure by the organic peroxide is not due to polymerization reaction by dehydrogenation.

[Component (D)]

As the platinum group metal base catalyst (D), any well-known addition reaction catalysts may be used. Such platinum group metal base catalysts include, for example, platinum, palladium, rhodium and ruthenium base catalysts, with the platinum base catalysts being preferred. Examples of the platinum base catalyst include platinum base compounds, e.g., platinum silica-alumina, platinum alumina-halide, and platinum rhodium, complexes of platinum with vinylsiloxanes, alcohol or aldehyde solutions of chloroplatinic acid, complexes of chloroplatinic acid with olefins, and complexes of chloroplatinic acid with vinylsiloxanes.

The organopolysiloxane composition of the invention is capable of addition reaction with a less amount of a platinum group metal base catalyst than in the prior art. The amount of component (D) blended is to give 1 to 500 ppm, preferably 1 to 200 ppm, more preferably 1 to 150 ppm of platinum group metal based on the weight of the organopolysiloxane composition, i.e., the total weight of components (A), (B), (C) and (D). If the amount of component (D) is less than 1 ppm, addition reaction does not take place and much unreacted functional groups are left behind, failing to form a satisfactory cured coating. If the amount of component (D) exceeds 500 ppm, reaction with moisture or inhibitor can take place, and the composition will cure on the way of working due to a short pot-life.

[Component (E)]

Component (E) is an addition reaction inhibitor, which is optional and serves to control the catalytic activity of the platinum group metal base catalyst. Included are organonitrogen compounds, organophosphorus compounds, acetylene compounds, oxime compounds, and organic chlorine compounds. Examples include acetylene alcohols such as 1-ethynyl-1-cyclohexanol, 3-methyl-1-butyn-3-ol, 3,5-dimethyl-1-hexyn-3-ol, 3-methyl-1-pentyn-3-ol, and 2-phenyl-3-butyn-2-ol, acetylene compounds such as 3-methyl-3-1-pent-1-yne and 3,5-dimethyl-3-hex-1-yne, the reaction products of acetylene compounds with alkoxysilanes, siloxanes or hydrogensilanes, e.g., 1,1-dimethylpropyny-loxytrimethylsilane, vinylsiloxanes such as cyclic tetram-ethylvinylsiloxane, organonitrogen compounds such as benzotriazole, organophosphorus compounds, oxime compounds, maleic acid compounds such as diallyl maleate, and organic chlorine compounds.

When used, the amount of component (E) blended is preferably 0.01 to 5 parts by weight, more preferably 0.1 to 3 parts by weight per 100 parts by weight of component (A). If the amount of component (E) is too small, the composition will cure on the way of working due to a short pot-life. If the amount of component (E) is too large, addition reaction does not take place, failing to form a cured coating.

[Optional components]

An organic solvent may be blended in the organopolysiloxane composition of the invention. Preferred as the organic solvent used herein are organic solvents (exclusive of siloxane solvents) in which organopolysiloxanes are soluble such as toluene, hexane, xylene, and methyl ethyl ketone, and organopolysiloxanes (or siloxane solvents) including low-viscosity cyclic siloxanes such as octamethyltetrasiloxane and decamethylpentasiloxane, linear siloxanes such as $M_2D_p$ wherein M and D are as defined above, and p is 0 or a positive number of up to 200, preferably 1 to 50, and branched siloxanes such as $M_{2+q}D_pT_q$ wherein M, D and T are as defined above, p is 0 or a positive number of up to 200, preferably 1 to 50, and q is a positive number of 1 to 10, preferably 1 to 3.

The amount of the organic solvent used is preferably 3 to 50 times, more preferably 8 to 30 times the total weight of components (A) and (B).

Other optional additives include, for example, high-molecular-weight linear organopolysiloxanes for imparting lubricity, aryl group-containing silicone resins for adjusting release force, silicone resins, silica, and the like.

[Preparation method]

The organopolysiloxane composition of the invention is obtained by mixing predetermined amounts of components (A) to (D) and if necessary, component (E) and optional components. Any components which are commonly blended in conventional release paper or film-forming organopolysiloxane compositions may be blended in the organopolysiloxane composition of the invention as long as the benefits of the invention are not impaired. When the composition is diluted with an organic solvent, its properties are not degraded.

The resulting organopolysiloxane composition preferably has a kinematic viscosity at 25° C. of 50 to 1,000 mm²/s, more preferably 100 to 500 mm²/s as measured by an Ostwald viscometer.

Since the release paper or film-forming organopolysiloxane composition of the invention is preferably a designated combustible material or non-dangerous material as the composition in view of the fire defense law, the organopolysiloxane composition preferably has a flash point of at least 250° C. In order that the organopolysiloxane composition have a flash point of at least 250° C., it is recommended to reduce the amount of a low-flash-point compound and to blend a high-flash-point component.

[Application and usage]

The organopolysiloxane composition is coated onto a sheet-like substrate such as paper or plastic film by means of a coating roll (e.g., three-roll mill, five-roll mill, gravure roll, offset gravure roll, etc.) and heat cured in a standard way. The sheet-like substrate having a cured silicone film of the organopolysiloxane composition disposed on one surface is advantageously used as a release sheet. Exemplary paper substrates include glassine paper, polyethylene-laminated paper, polyvinyl alcohol resin-coated paper and clay-coated paper. Exemplary plastic film substrates include films of polyethylene, polypropylene, and polyethylene terephthalate.

The coating weight of the organopolysiloxane composition may be sufficient to form a cured silicone film on the surface of a sheet-like substrate, for example, about 0.1 to 5.0 g/m². An excessive coating weight may rather invite a drop of release performance.

Although the heat curing conditions vary with the type of substrate and the coating weight, a cured film can be formed on a substrate by heating at 80 to 200° C., preferably 100 to 180° C. for 60 to 1 second, preferably 30 to 2 seconds.

EXAMPLES

Examples and Comparative Examples are given below for further illustrating the invention although the invention is not limited thereto. It is noted that the vinyl value and Si—H group content are determined by ¹H-NMR spectroscopy, the kinematic viscosity is measured at 25° C. by an Ostwald viscometer, and the flash point is determined by the Cleveland open cup method (ISO 2592:2000, JIS K2265-4:2007).

[Raw materials used]

Component (A)

Methylvinylpolysiloxane (1)

polysiloxane of the following structure having a vinyl value of 0.0166 mol/100 g and a kinematic viscosity of 440 mm²/s $$\{(CH_2{=}CH)(CH_3)_2SiO_{1/2}\}_2\{(CH_3)_2SiO\}_{160}$$

Component (B)

Methylhydrogenpolysiloxane (2)

methylhydrogenpolysiloxane of the following structure having a Si—H content of 1.62 mol/100 g and a kinematic viscosity of 35 mm²/s $$\{(CH_3)_3SiO_{1/2}\}_2\{(CH_3)HSiO\}_{100}$$

Component (C)

Perhexa HC (by NOF Corp., 1,1-di(t-hexylperoxy)cyclohexane, 10-hour half-life temperature 87.1° C., heat generation starting temperature 134° C., measurement concentration 0.05 mol/L)

Perhexa C (by NOF Corp., 1,1-di(t-butylperoxy)cyclohexane, 10-hour half-life temperature 90.7° C., heat generation starting temperature 134° C., measurement concentration 0.1 mol/L)

(Other component)

Leuco dye: acting as a poison to platinum catalyst

Example 1

By combining 100 parts by weight of methylvinylpolysiloxane (1) as component (A) with 1.77 parts by weight of methylhydrogenpolysiloxane (2) as component (B), 1 part by weight of Perhexa C as component (C), and 0.3 part by weight of 1-ethynyl-1-cyclohexanol as component (E), agitating them until uniform, adding platinum-vinylsiloxane complex as component (D) in such an amount as to give 100 ppm by weight of platinum atom based on the total weight of components (A), (B), (C), (D) and (E), and agitating the contents until uniform, there was prepared an organopolysiloxane composition having a kinematic viscosity of 422 mm²/s, a H/Vi (i.e., ratio of Si—H groups to alkenyl groups in the composition) of 1.72, and a flash point of 277° C.

Example 2

In accordance with the same formulation as in Example 1 except that 1.2 parts by weight of the platinum-vinylsiloxane complex as component (D) was added so as to give 60 ppm by weight of platinum atom based on the total weight of components (A), (B), (C), (D) and (E), there was prepared a composition having a kinematic viscosity of 421 mm²/s, a H/Vi of 1.72, and a flash point of 275° C.

Comparative Example 1

In accordance with the same formulation as in Example 1 except that component (C) was omitted, there was prepared a composition having a kinematic viscosity of 435 mm²/s, a H/Vi of 1.72, and a flash point of 280° C.

Comparative Example 2

In accordance with the same formulation as in Example 2 except that component (C) was omitted, there was prepared a composition having a kinematic viscosity of 434 mm²/s, a H/Vi of 1.72, and a flash point of 278° C.

Example 3

By stirring in accordance with the same formulation as in Example 1 except that component (C) was changed to Perhexa HC and the amount of 1-ethynyl-1-cyclohexanol as component (E) was increased to 0.5 part by weight, there was prepared a composition having a kinematic viscosity of 421 mm²/s, a H/Vi of 1.72, and a flash point of 264° C.

Example 4

By stirring in accordance with the same formulation as in Example 1 except that component (C) was changed to Perhexa HC and the amount of 1-ethynyl-1-cyclohexanol as component (E) was increased to 0.8 part by weight, there was prepared a composition having a kinematic viscosity of 419 mm²/s, a H/Vi of 1.72, and a flash point of 252° C.

Comparative Example 3

By stirring in accordance with the same formulation as in Comparative Example 1 except that the amount of 1-ethynyl-1-cyclohexanol as component (E) was increased to 0.5 part by weight, there was prepared a composition having a kinematic viscosity of 422 mm²/s, a H/Vi of 1.72, and a flash point of 267° C.

Comparative Example 4

By stirring in accordance with the same formulation as in Comparative Example 1 except that the amount of 1-ethynyl-1-cyclohexanol as component (E) was increased to 0.8 part by weight, there was prepared a composition having a kinematic viscosity of 420 mm²/s, a H/Vi of 1.72, and a flash point of 258° C.

Example 5

A composition was prepared in accordance with the same formulation as in Example 1 except that 0.1 part by weight of Leuco dye was added as an additive, the composition having a kinematic viscosity of 425 mm²/s, a H/Vi of 1.72, and a flash point of 277° C.

Comparative Example 5

A composition was prepared in accordance with the same formulation as in Comparative Example 1 except that 0.1 part by weight of Leuco dye was added as an additive, the composition having a kinematic viscosity of 427 mm²/s, a H/Vi of 1.72, and a flash point of 280° C.

The compositions obtained above were evaluated by the following tests. The results are tabulated in Tables 1 to 3.

[Release Force]

The composition was coated on the metal roll of a RI tester (IHI Machinery & Furnace Co., Ltd.), uniformly stretched by rotating two rolls (i.e., metal and rubber rolls) for 45 seconds, and then transferred from the rubber roll to glassine paper ASP (Ahistrom-Munksjo). The glassine paper having the composition transferred thereto was heated in a hot air dryer at 120° C. for 30 seconds, completing a release paper bearing a cured film of the composition having a thickness of 0.9-1.1 g/m². After aging at 25° C. for 24 hours in this state, TESA-7475 tape (Tesa UK Ltd.) was attached to the cured film surface of the release paper (side transferred from the rubber roll), which was cut to a size of 2.5 cm by 18 cm. This test piece was sandwiched between glass plates, and aged at 25° C. under a load of 70 g/cm² and at 70° C. under a load of 20 g/cm² for 24 hours. Thereafter, an end portion of the test piece was detached, and the end portion of the PSA-bearing substrate of the tape was pulled back at a peeling speed of 0.3 m/min at an angle of 180° relative to the glassine paper, during which a force (N/50 mm) required for peeling was measured by a tensile tester (model AGS-50G by Shimadzu Corp.) and reported as "release force."

[Residual adhesion rate]

The TESA-7475 tape after the measurement of release force was attached to a polyester film and pressed by rolling back and forth a roller of 2 kg one cycle. The assembly was allowed to stand for 30 minutes, an end portion of the TESA-7475 tape was detached, and the end of the tape was peeled at a peeling speed of 0.3 m/min by pulling back at an angle of 180° relative to the polyester film. A force (N/25 mm) required for peeling: release force "A" was measured.

As a blank, virgin TESA-7475 tape was attached to a polyester film and then as above, pressed by rolling back and forth a roller of 2 kg one cycle. The assembly was allowed to stand for 30 minutes, an end portion of the TESA-7475 tape was detached, and the end of the tape was peeled at a peeling speed of 0.3 m/min by pulling back at an angle of 180° relative to the polyester film. A force (N/25 mm) required for peeling: release force "B" was measured. A residual adhesion rate (%) was determined by computing (A/B)×100.

[Cure]

The composition was coated on the metal roll of the tester, uniformly stretched by rotating two rolls (metal and rubber rolls) in contact for 45 seconds, and then transferred from the rubber roll to polyethylene-laminated paper. The polyethylene-laminated paper having the composition transferred thereto was heated in a hot air dryer at 120° C. for 30 seconds, completing a release paper bearing a cured film of the composition having a thickness of 0.9-1.1 g/m². Immediately after the release paper was taken out of the dryer, the cured film on its surface was intensely rubbed with the forefinger 10 cycles. With red marker ink applied to the film surface, the ink concentration and the cured film state were observed.

The results are expressed "x" when the finger mark looked dense, "Δ" when the finger mark looked thin, and "○" when the finger mark was substantially unperceived.

[Silicone migration]

As in the measurement of release force, a polyethylene terephthalate film of 36 μm thick was laid on the surface of the cured film of the composition formed on the surface of polyethylene-laminated paper and press bonded at room temperature (25° C.) under a pressure of 0.98 MPa for 20 hours. Thereafter, the PET film was detached from the cured film. Oily ink (tradename: Magic Ink by Teranishi Chemical Industry Co., Ltd.) was applied to the surface of the PET film which had been in contact with the cured film, silicone migration was evaluated in terms of ink cissing.

The results are expressed "○" for no ink cissing: no or little silicone migration, and "x" for ink cissing: noticeable silicone migration.

TABLE 3-continued

| Formulation (pbw) | Example 5 | Comparative Example 5 |
|---|---|---|
| <Physical properties> | | |
| H/Vi | 1.72 | 1.72 |
| Kinematic viscosity (mm²/s) | 425 | 427 |
| Flash point (° C.) | 277 | 280 |

TABLE 1

| | Formulation (pbw) | Example 1 | Example 2 | Comparative Example 1 | Comparative Example 2 |
|---|---|---|---|---|---|
| (A) | methylvinylpolysiloxane (1) | 100 | 100 | 100 | 100 |
| (B) | methylhydrogenpolysiloxane (2) | 1.77 | 1.77 | 1.77 | 1.77 |
| (C) | Perhexa C | 1 | 1 | — | — |
| (D) | platinum-vinylsiloxane complex | 2.0 | 1.2 | 2.0 | 1.2 |
| (E) | 1-ethynyl-1-cyclohexanol | 0.3 | 0.3 | 0.3 | 0.3 |
| | <Pt concentration> ppm | 100 | 60 | 100 | 60 |
| | <Physical properties> | | | | |
| | H/Vi | 1.72 | 1.72 | 1.72 | 1.72 |
| | Kinematic viscosity (mm²/s) | 422 | 421 | 435 | 434 |
| | Flashpoint (° C.) | 277 | 275 | 280 | 278 |
| | <Release properties> | | | | |
| | Release force (N/25 mm) @25° C., 70 g/cm², 24 hr | 0.12 | 0.14 | 0.17 | 0.23 |
| | Release force (N/25 mm) @70° C., 20 g/cm², 24 hr | 0.23 | 0.26 | 0.30 | 0.48 |
| | Residual adhesion rate (%) @25° C., 70 g/cm², 24 hr | 97 | 95 | 93 | 86 |
| | Residual adhesion rate (%) @70° C., 20 g/cm², 24 hr | 96 | 94 | 91 | 86 |
| | Cure | ○ | ○ | Δ | x |
| | Silicone migration | ○ | ○ | Δ | x |

TABLE 2

| | Formulation (pbw) | Example 3 | Example 4 | Comparative Example 3 | Comparative Example 4 |
|---|---|---|---|---|---|
| (A) | methylvinylpolysiloxane (1) | 100 | 100 | 100 | 100 |
| (B) | methylhydrogenpolysiloxane (2) | 1.77 | 1.77 | 1.77 | 1.77 |
| (C) | Perhexa HC | 1 | 1 | — | — |
| (D) | platinum-vinylsiloxane complex | 2.0 | 2.0 | 2.0 | 2.0 |
| (E) | 1-ethynyl-1-cyclohexanol | 0.5 | 0.8 | 0.5 | 0.8 |
| | <Pt concentration> ppm | 100 | 100 | 100 | 100 |
| | <Physical properties> | | | | |
| | H/Vi | 1.72 | 1.72 | 1.72 | 1.72 |
| | Kinematic viscosity (mm²/s) | 421 | 419 | 422 | 420 |
| | Flashpoint (° C.) | 264 | 252 | 267 | 258 |
| | <Release properties> | | | | |
| | Release force (N/25 mm) @25° C., 70 g/cm², 24 hr | 0.13 | 0.14 | 0.21 | 0.34 |
| | Release force (N/25 mm) @70° C., 20 g/cm², 24 hr | 0.23 | 0.27 | 0.29 | 0.49 |
| | Residual adhesion rate (%) @25° C., 70 g/cm², 24 hr | 96 | 96 | 89 | 78 |
| | Residual adhesion rate (%) @70° C., 20 g/cm², 24 hr | 95 | 94 | 90 | 77 |
| | Cure | ○ | ○ | x | x |
| | Silicone migration | ○ | ○ | x | x |

TABLE 3

| | Formulation (pbw) | Example 5 | Comparative Example 5 |
|---|---|---|---|
| (A) | methylvinylpolysiloxane (1) | 100 | 100 |
| (B) | methylhydrogenpolysiloxane (2) | 1.77 | 1.77 |
| (C) | Perhexa C | 1 | — |
| (D) | platinum-vinylsiloxane complex | 2.0 | 2.0 |
| (E) | 1-ethynyl-1-cyclohexanol | 0.3 | 0.3 |
| Other | Leuco dye | 0.1 | 0.1 |
| | <Pt concentration> ppm | 100 | 100 |

TABLE 3-continued

| Formulation (pbw) | Example 5 | Comparative Example 5 |
|---|---|---|
| <Release properties> | | |
| Release force (N/25 mm) @25° C., 70 g/cm², 24 hr | 0.14 | 0.31 |
| Release force (N/25 mm) @70° C., 20 g/cm², 24 hr | 0.26 | 0.58 |

TABLE 3-continued

| Formulation (pbw) | Example 5 | Comparative Example 5 |
|---|---|---|
| Residual adhesion rate (%) @25° C., 70 g/cm², 24 hr | 95 | 79 |
| Residual adhesion rate (%) @70° C., 20 g/cm², 24 hr | 93 | 80 |
| Cure | o | x |
| Silicone migration | o | x |

It is noted that Leuco dye in Table 3 is a catalyst poison. The composition of Comparative Example 5 obtained by removing Perhexa C from the composition of Example 1 and adding 0.1 part by weight of Leuco dye shows degraded curability, much silicone migration because of migration of the uncured component, a residual adhesion rate of up to 80%, and a nearly 3 times higher release force. The composition of Example 5 corresponding to the composition of Comparative Example 5 having 1 part by weight of Perhexa C added thereto is improved in cure despite the presence of Leuco dye as catalyst poison, and show satisfactory values of release force, residual adhesion rate, and silicone migration.

The invention claimed is:

1. An organopolysiloxane composition for release paper or release film, comprising at least the following components (A) to (D):

(A) 100 parts by weight of an organopolysiloxane having at least two silicon-bonded alkenyl groups per molecule and a structure of the following formula (1):

$$M_a M^{vi}_b D_c D^{vi}_d T_e T^{vi}_f Q_g \qquad (1)$$

wherein M is $R_3SiO_{1/2}$, $M^{vi}$ is $R_2PSiO_{1/2}$, D is $R_2SiO_{2/2}$, $D^{vi}$ is $RPSiO_{2/2}$, T is $RSiO_{3/2}$, $T^{vi}$ is $PSiO_{3/2}$, Q is $SiO_{4/2}$, R is each independently a $C_1$-$C_{12}$ substituted or unsubstituted monovalent hydrocarbon group free of aliphatic unsaturation, P is an alkenyl group of the formula: $—(CH_2)_n—CH=CH_2$ wherein n is an integer of 0 to 6, a is 0, b, d and f are each independently 0 or a positive number, not all b, d and f are 0 at the same time, $2\leq b+d+f\leq500$, c is a positive number of 10 to 27,000, e is 0 or a positive number of up to 200, and g is 0 or a positive number of up to 1,000, (B) an organohydrogenpolysiloxane having on the average at least two silicon-bonded hydrogen atoms (or Si—H groups) per molecule in an amount to give 1 to 5 moles of Si—H groups per mole of alkenyl groups in component (A), (C) an organic peroxide in an amount of 0.01 to 5 parts by weight per 100 parts by weight of component (A), and (D) a platinum group metal base catalyst in an amount to give 1 to 500 ppm of platinum group metal based on the total weight of components (A), (B), (C) and (D).

2. The organopolysiloxane composition of claim 1, further comprising (E) an addition reaction inhibitor in an amount of 0.01 to 5 parts by weight per 100 parts by weight of component (A).

3. The organopolysiloxane composition of claim 1 wherein component (C) is a polyfunctional organic peroxide having at least two peroxy bonds in the molecule.

4. The organopolysiloxane composition of claim 1 wherein component (C) has a 10-hour half-life temperature of 70° C. to 120° C.

5. The organopolysiloxane composition of claim 1 wherein the organic peroxide component (C) is a peroxyketal.

6. The organopolysiloxane composition of claim 1 wherein the organic peroxide as component (C) has a heat generation starting temperature of at least 100° C. as analyzed by DSC.

7. The organopolysiloxane composition of claim 1, having a flash point of at least 250° C.

8. The organopolysiloxane composition of claim 1, wherein d and f are each independently 0 in the formula (1).

9. A release paper or release film containing a sheet shaped substrate and a cured silicone film on the surface of the sheet shaped substrate, wherein the cured silicone film is formed on the sheet shaped substrate by heating the composition of claim 1 at 80 to 200° C. for 1 to 60 seconds.

* * * * *